United States Patent Office 3,817,889
Patented June 18, 1974

3,817,889
POLISHING COMPOSITION
Hans-Ferdi Fink, Essen-Ruttenscheid, and Gotz Koerner and Gunter Schmidt, Essen, Germany, assignors to Th. Goldschmidt AG, Essen, Germany
No Drawing. Continuation-in-part of abandoned application Ser. No. 44,532, June 8, 1970. This application Nov. 29, 1972, Ser. No. 310,262
Claims priority, application Germany, June 10, 1969, P 19 29 298.9
Int. Cl. C08g 51/52
U.S. Cl. 260—28  17 Claims

ABSTRACT OF THE DISCLOSURE

A polishing composition comprises (a) natural and/or synthetic wax with an acid number of about 5 to 200 or mixtures thereof, having a solidification point of between 60 and 100° C. and a mixture consisting essentially of (b) 30 to 60% by weight of methylsiloxanols of a viscosity of 25 to 1000 cp., and having an OH-content of not more than 8.8% by weight, 10 to 30% by weight of methylsiloxanes containing $SiOMNZ_2$-groups, wherein, M is bivalent hydrocarbon which bridges O and N through at least two carbon atoms and wherein Z is alkyl, aryl, the group

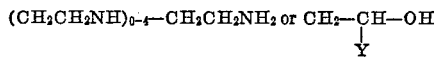

or, preferably hydrogen, 5 to 15% by weight of an organic tin catalyst inducing hardening of silicones as well as 15 to 40% by weight of esters of aliphatic alcohols of silicic acid, titanic acid or zirconic acid and/or their partial hydrolysates and/or their condensation products or fatty acid acylates of Ti or Zr, in which the fatty acid has a carbon number of at least 8.

The ratio of (a):(b) is between about 1:4 to 4:1. The components (a) and (b) may be used in the composition in customary concentrations and may be dissolved in organic solvents or be emulsified in water.

REFERENCE TO PRIOR APPLICATION

This is a continuation-in-part of U.S. patent application Ser. No. 44,532, filed on June 8, 1970, now abandoned.

FIELD OF INVENTION

The invention relates to polishing compositions. The term polishing composition or polish as used herein, is deemed to refer to wax-containing liquids as they are used for protecting, cleaning, preserving and polishing glossy surfaces, such as lacquered, varnished or baked enamel surfaces, and for imparting gloss to such surfaces. Although the inventive polishing composition may be used for the polishing of such surfaces in general, it is particularly applicable to, and hence will be described in connection with the polishing of motor car bodies.

BACKGROUND INFORMATION AND PRIOR ART

For the care and preservation of lacquered or varnished surfaces, as well as baked enamel surfaces, solutions and emulsions of natural or synthetic waxes or wax mixtures have been used in the past. The wax component contained in the solutions or emulsions, after evaporation of the solvent or the water, is distributed by rubbing or the like on the surface to be treated in the form of a uniform, glossy film or coating.

It has previously been proposed to add silicone oils to such polishing agents containing a wax component. Such wax-silicone-oil containing compositions or preparations are predicated on the fact that silicone oils do not mix with waxes so that the silicone contained in the polishing composition may serve as a lubricant for the wax crystals. The state of the art in this respect is described in detail in the book "Chemie und Technologie der Silicone" by Walter Noll, Verlag Chemie, 1960, pages 385 and 386, to which reference is had.

More recently, polish preserving agents have been proposed which are marketed in emulsion form and which, if used for car washing purposes, are added to the wash water with which the car is finally washed after the dirt has been removed from the car body. After drying or rubbing of the motor car surface, a glossy coating is obtained.

Such polishing compositions have to meet a number of requirements which cannot satisfactorily be met with the present state of the art. Thus, for example, if the polishing compositions are in the form of organic solutions or dispersions, no deposits should, of course, be formed after prolonged storage which cannot subsequently be dispersed again.

Further, polishing compositions in emulsion form can only find commercial application if no oily phase separates or forms a top layer on the preparations. Moreover the coatings obtained by the polishes should yield a high gloss which latter should be obtained by the application proper or upon reasonable rubbing. Most suitable are such polishing compositions, which give high gloss while requiring but a minimal force for polishing. Of particular importance is the requirement that the glossy layer which has been formed on the substrate is capable of surviving subsequent cleaning or washing operations without losing the gloss. This requirement is particularly difficult to meet in a satisfactory manner since in the prior art polishing compositions, including the most recent ones, the wax-silicone layer has a tendency to be removed by the washings.

Most recently, relatively wash-resistant car waxes have been recommended which contain polydimethylsiloxane having amino-groups which are linked to the silicon structure through carbon. It is true that incorporation of such polydimethylsiloxanes into car waxes or polishing compositions results in products which, if compared with the more conventional compositions, exhibit an improved detergent resistance. However, it is also a fact that these latter compositions exhibit the vary important disadvantage that the moisture in the air or a very small content of water in the solvents causes a very significant increase in the viscositoy of these modified silicones which ultimately results in gelling of these products. For this reason, it is not possible to add these amino-functional polysiloxanes to aqueous preparations, to wit, for example, aqueous polishes in emulsion form. Further, although these latter preparations exhibit improved detergent resistance, they have the additional disadvantage that if the modified polysiloxanes are used in polishing compositions containing organic solvents, very often flake formation takes place after a relatively short time of storage. These relatively large sized flakes cannot be dispersed again even by vigorous shaking of the preparation. The flocculation is caused by precipitation of the modified siloxanes referred to.

SUMMARY OF THE INVENTION

It is a primary object of this invention to provide polishing compositions which overcome the drawbacks of the prior art and which exhibit superior characteristics in respect to stability, storage, life, gloss imparting properties easiness in obtaining high gloss without requiring much force for the polishing action, and detergent resistance.

Generally it is an object of the invention to improve on the art of polishing compositions as presently practiced.

Briefly and surprisingly, it has been ascertained that the above objects are superiorly obtained by a polishing composition which contains (a) conventional natural and/or synthetic waxes of an acid number of 5 to 200, as usually employed in the preparation of polishing compositions having a solidification point of between 60 and 100° C. and a mixture which consists essentially of (b) 30 to 60% by weight of methylsiloxanols of a viscosity of 25 to 1000 cp. and having an OH-content of not more than 8.8% by weight, 10 to 30% by weight of methylsiloxanes with $SiOMNZ_2$-groups, wherein M is a bivalent hydrocarbon which bridges O and N through at least two carbon atoms, and Z stands for alkyl, aryl, the group $(CH_2CH_2NH)_{0-4}$—$CH_2CH_2NH_2$, the group

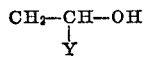

or preferably hydrogen, 5 to 15% by weight of an organic tin catalyst for hardening or curing of silicones as well as 15 to 40% by weight of esters of aliphatic alcohols of silicic acid, titanic acid or zirconic acid and/or their partial hydrolysates and/or their condensation products or fatty acid acylates of Ti or Zr, in which the fatty acid has a carbon number of at least 8.

The ration of the components (a):(b) should be between 1:4 to 4:1. The composition may be employed in the polishing preparation in the customary concentration, dissolved in organic solvents or emulsified in water.

The components of the mixture (b) as defined above are primarily responsible for the detergent resistance and the obtained improvement of the gloss imparting characteristics. These components will now be discussed in detail.

The methylsiloxanols which are present within the mixture (b) in an amount of about 30 to 60% by weight and which exhibit a viscosity of 25 to 1000 cp., may be of the linear or branched kind.

An example of a linear polysiloxanol which may successfully be used as a component in mixture (b) for the purposes of this invention is a polymer of the formula I

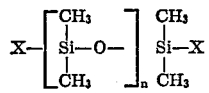

In this formula X stands for OH while n is $\geq 4$. These linear siloxanols of formual I are the preferred methylsiloxanols used for this invention.

An example for a siloxane with branched chain, is a polymer of the formula II

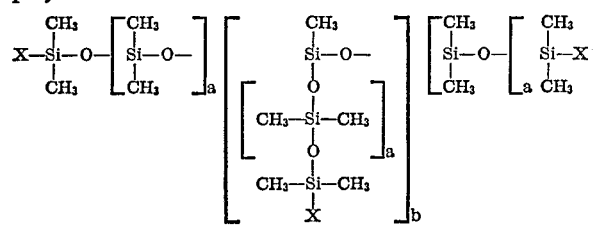

In this formula, X, as in formula I, stands for hydroxyl. The index $a$ is $\geq 1.5$, while the index $b$ has a value of from 0 to 20. Branched polysiloxanols are preferred which contain $CH_3SiO_{3/2}$-groups in an amount up to 15 mol percent. In such event, the indices $a$ and $b$ are associated with each other by the following equation $$\frac{b}{2a+2+ab+2b} \leq 0.15$$

Another limitation for the values of $a$ and $b$ is due to the condition, that the OH-content should be not more than 8.8% by weight. The methylsiloxanols of this invention can be prepared by hydrolysing the corresponding methylchlorosiloxanylsulfates with water in the presence of an acid acceptor as shown in the German Pat. No. 1,300,697.

The wax containing polishing dispersions have some times a tendency to separate. To prevent this, methylsiloxanols can be used in which not more than 20 mol percent of the methyl groups are substituted by alkyl groups having C-numbers of 8 to 22.

The mixture (b) defined above also contains 10 to 30% by weight of methylsiloxanes which have $SiOMNZ_2$-groups, wherein M and Z have the above meaning. Suitable examples for M are

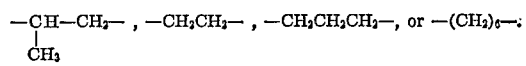

The group

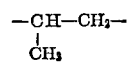

is preferred.

It is preferred to use substituted methylsiloxanes which contain, per molecule, 2 to 50 of such $SiOMNZ_2$-groups with the additional condition that the ratio of $(Si)CH_3$-groups: $(Si)OMNZ_2$-groups=1:1 to 100:1. Also these compounds may be of the straight chain kind or may be branched and are embraced by formulas I and II. The substituent X is then, however, the group $OMNZ_2$. The index $n$ in that event preferably then has a value of from 5 to 50.

Most preferred are siloxanes in the light of this invention containing $OMNZ_2$-groups corresponding to formula I wherein

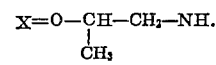

In formula II, X stands also for $OMNZ_2$. The index $a$ has a value of from 2 to 12, while the index $b$ has a value of from 1 to 10.

Another possible structure is illustrated in formula III in which Y stands for hydrogen or methyl:

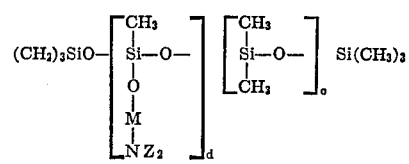

The index $c$ has a value of from 0 to 100, while the index $d$ has a value of from 3 to 50. The $OMNZ_2$-groups containing methylsiloxanes of this invention can be prepared by reacting the corresponding methylchlorsiloxanylsulfates with the alcohols of formula $HOMNZ_2$ together with an acid acceptor, or by using an equivalent amount of $HOMNZ_2$ as acid acceptor as shown in the Germany Offenlegungsschrift No. 1,759,557. Other ways for the preparation of these methylsiloxanes containing $OMNZ_2$-groups are to use the corresponding methylsiloxanes as starting materials having (Si)Cl, (Si)—H or (Si)—O alkyl groups, whereby these groups will be exchanged by $OMNZ_2$-groups during reaction with the alcohol $HOMNZ_2$.

The mixture (b) moreover contains 5 to 15% by weight of organic tin catalysts for the purpose of hardening or curing silicones. Such organic tin catalysts are known per se. Preferred examples for such tin catalysts are dibutyltindilaurate, dimethyltindihexoate or tinoctoate.

Another ingredient of mixture (b) consists of 15 to 50% by weight of esters of aliphatic alcohols of silicic acid, titanic acid or zirconic acid. These esters may also be present in the form of partial hydrolysates or condensation products or in the form of mixtures of esters, partial hydrolysates and condensation products. Examples for such esters are the esters of the mentioned acids with aliphatic alcohols, such as ethylalcohol, butylalcohol, stearylalcohol. Preferred are alkylpolysilicates especially ethylpolysilicate. Useful are also fatty acid acylates of Ti or Zr, in which the fatty acid has a carbon number of at least 8. The preferred acylates of Ti or Zr are the stearates, especially Ti- or Zr-tetrastearate.

In the event that the inventive polishing compositions are used in emulsion form, it is then recommended to use water soluble esters or their partial hydrolysates or condensation products. Of particular advantage is in that case the use of esters for whose preparation mono-, di-, or triethanolamine or mono-, di-, or triisopropanolamine or polyethyleneglycolmonoether were used as the alcoholic component.

It is most surprising that the inventive mixture (b) can be successfully used for the preparation of stable polishing compositions of the desired nature and having the desired characteristics, particularly if viewed in the light of the state of the art. A person skilled in formulating polishing compositions, would have expected that the large amounts of tin catalysts would cause the used siloxanols and also the siloxanes carrying the $SiOMNZ_2$-groups to be changed into their highest molecular condition. This should have resulted in the formation of siloxanes which are no longer soluble in the system. On the other hand, it would have been reasonable to expect that the $SiOMNZ_2$-groups would split off hydrolytically in the presence of water and that thereby the anchoring action of the amino groups would be lost. The fact of the matter, however, is that the inventive polishing compositions containing the mixture (b) possess a storage life capacity which is by far superior to that of the known products.

Component (a) of the inventive composition is the wax component which consists of customary natural and/or synthetic waxes usually employed in compositions of this nature. Carnauba wax is a preferred example of a natural wax for the inventive purpose. In respect to synthetic waxes, suitable examples are ester waxes capable of self-emulsion, acid waxes, partially saponified ester waxes and polyethylene waxes.

As previously stated, the ratio of the wax component or mixture (a) and the mixture (b) should be about between 1:4 to 4:1. The mixture (a), (b) may be used in the preparation in customary concentrations and may either be dissolved in organic solvents or emulsified in water. The term "customary concentration," as used herein, refers to that concentration in which the effective ingredients, to wit, waxes, silicones et cetera are customarily contained in polishing compositions. Generally, about 1.5 to 8% by weight of waxes and about 1.5 to 5% by weight of silicone are present in the preparation if the mixture (a), (b) is dissolved in a solvent. By contrast, if the preparation is in the form of an aqueous emulsion, about 1.5 to 15% by weight of waxes and about 1.5 to 5% by weight of silicone are contained therein.

It is recommended that the amount of wax is adapted to the amount of N in the $SiOMNZ_2$-group modified methylsiloxane in such a manner that one COOH-group in the wax corresponds to not more than one N-atom in the modified methylsiloxane. This can be easily accomplished by adjusting the acid number of the wax by mixing several waxes of different acid content so as to obtain the desired value. This feature influences the polishing capacity to a particularly beneficial extent.

It is also advantageous additionally to add to the preparation dimethylsilicone oils of a viscosity of between 1000 and 10,000 cp. in which event 2 parts by weight of wax should correspond to 0.25 to 1.5 parts by weight of dimethylsilicone oil. Due to this measure the polishing capacity, the gloss and the color depth are improved.

If an exceptionally high gloss is wanted by using low rubbing energy, sometimes difficulties may arise in applying the polishes to black or dark lacquers. These difficulties are due to the formation of opaque stripes. In these cases the addition of certain methylsiloxanes containing sulfatopropyl groups gives a further improvement. The addition of these methylsiloxanes containing sulfatopropyl groups is causing also a finer wax dispersion and therefore a more stable wax dispersion. These methylsiloxanes containing sulfatopropyl groups have the formula IV

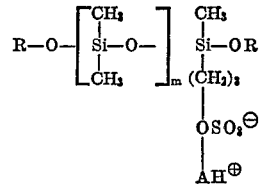

wherein R is a lower alkyl with 1 to 3 carbon atoms, $(CH_3)_3Si-$ or H. $AH^\oplus$ is a substituted ammonium group derived from primary, secondary or tertiary amines, having not more than 12 carbon atoms e.g. isopropylammonium, triethylammonium, diethylammonium, dodecylammonium and $m$ is 0 to 20 if $R=(CH_3)Si$ or 2 to 20 if R is a lower alkyl or H.

These methylsiloxanes containing sulfatopropyl groups are added in amounts of 0.05 to 0.4% to the final compositions or emulsions, respectively in amounts of 2 to 16% of the total wax content. The preparation of these methylsiloxanes containing sulfatopropyl groups is described in the German Pat. No. 1,157,789.

The invention will now be described by several examples, it being understood, however, that these examples are given by way of illustration and not by way of limitation and that many changes may be effected without affecting in any way the scope and spirit of the invention as recited in the appended claims.

The examples include comparison tests and demonstrate the characteristics and compositions of the inventive polishes.

EXAMPLE 1

This example is concerned with the preparation and characteristics of polishing composition in solvent form.

Preparation of the Inventive Polishing Compositions 1a, 1b, 1c, and 1d

Four polishing compositions, 1a, 1b, 1c and 1d were prepared according to the following formulation:

2.5 parts by weight of an ester wax, consisting of a mixture of carnauba wax and oxydized montan wax of an acid number of 35 (mg. KOH per gram wax),
2.1 parts by weight of methylsiloxanol,
1 part by weight of methylsiloxane with $$SiO\underset{CH_3}{CH}CH_2NH_2- \text{groups},$$

0.9 parts by weight of ester of silicic acid, titanic acid or zirconic acid,
0.5 parts by weight of an organic tin catalyst and
0.5 parts by weight of a dimethyl silicone oil of a viscosity of 5000 cp.

were dissolved in 92.5 parts by weight of white spirit.

Reference is had to the following table which in respect to compositions 1a, 1b, 1c, and 1d indicates the individually used methylsiloxanols in column 1, while the methylsiloxanes, wherein $$X=SiO\underset{CH_3}{CH}CH_2NH_2- \text{groups}$$

are indicated in column 2. The organic tin catalysts are referred to in column 3, while the esters of the silicic acid, the titanic acid or the zirconic acid are referred to in column 4.

TABLE

| | Column 1 | Column 2 | Column 3 | Column 4 |
|---|---|---|---|---|
| Polishing composition: | | | | |
| 1a | According to Formula I, 250 cp. | According to Formula I, $n=15$. | Dibutyltindilaurate | $C_2H_5OSi-\left[O-\underset{\underset{CH_3}{|}}{CH}-CH_2-\right]_3 N$ |
| 1b | According to Formula II, $a=5.4; b=2$. | According to Formula II, $a=6; b=2$. | Dimethyltindihexoate | Same as above. |
| 1c | According to Formula I, 1,000 cp. | According to Formula II, $a=6; b=2$. | Dibutyltindilaurate | 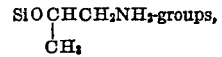 |
| 1d | According to Formula I, 400 cp. | According to Formula I, $n=15$. | ....do.... | Zirconiumbutoxide. |

Preparation of the Comparison Polishing Composition 1e 2 parts by weight of the same wax mixture, 2.5 parts by weight of a silicone oil with terminal trimethylsilyl-groups and a viscosity of 350 cp. were dissolved in 95.5 parts by weight of white spirit.

Preparation of the Comparison Polishing Composition 1f 2 parts by weight of the same ester wax, 3 parts by weight of a commercially available silicone which contains amino-groups linked through SiC-groups were dissolved in 95 parts by weight of white spirit.

Testing of the Inventive Polishing Compositions 1a Through 1d and Comparison With the Conventional Comparison Polishing Compositions 1e and 1f For the purpose of testing the polishing compositions, equal amounts of the respective composition per area unit were applied to one half of a sheet metal plate used in the manufacture of car bodies and having a black lacquer finish. The other half of the sheet was treated in the same manner with the comparison composition. The applied compositions were then rubbed on the sheet surface.

After a storage time of 2 and 24 hours, the polished plates were washed with a detergent-containing solution. Rinsing was subsequently effected with tap water. The thus treated plates were then placed below a water jet at an angle of about 20°. The water jet was adjusted to deliver a spray so that the entire surface of the plate was wetted by the water. By suddenly shutting off the water jet, the degree of wetting of the plate can be determined. If the coating obtained by the polishing composition has been washed off by the treatment with the detergent containing solution, then the water film contracts on the plate at a reasonable speed. By contrast, if the polish film on the plate is resistant to detergents and thus has not been washed off, the water runs off the plate very quickly.

The following Table indicates the detergent resistance of the respective polishing compositions 1a through 1f as well as the state and consistency of the compositions after a storage period of 4 weeks.

TABLE

| | Number of washings necessary to wash off the polish | | Consistency of the polishing composition after a storage period of four weeks |
|---|---|---|---|
| | (a) | (b) | |
| Polishing composition: | | | |
| 1a | 5–5 | 5–6 | Unchanged. |
| 1b | 5–6 | 5–6 | Do. |
| 1c | 5–6 | 5–6 | Do. |
| 1d | 5–6 | 5–6 | Do. |
| 1e | 1–2 | 1–2 | Do. |
| 1f | 1–2 | 5–6 | Precipitation of gel-like particles which cannot be re-dispersed. | a Measured 2 hours after application of the polishing composition.
b Measured 24 hours after application of the polishing composition.

EXAMPLE 2

This example is concerned with the preparation and characteristics of polishing compositions in emulsion form.

Preparation of the Inventive Polishing Compositions 2a, 2b, and 2c 5.5 parts by weight of an acid wax having an acid number of 15,
1.4 parts by weight of a fatty alcohol polyglycolether (serving as emulsifier),
0.7 parts by weight of triethanolamine,
20 parts by weight of white spirit,
2 parts by weight of highly disperse silicic acid,
3 parts by weight of methylsiloxanol,
1 part by weight of methylsiloxane with $$SiO\underset{\underset{CH_3}{|}}{CH}CH_2NH_2\text{-groups,}$$

0.5 parts by weight of an organic tin catalyst,
1.6 parts by weight of a water soluble ester of the silicic acid (respectively titanic acid or zirconic acid), and
64.3 parts by weight of water are processed in conventional manner to form an emulsion.

Reference is had to the following Table which indicates in column 1 the specific methylsiloxanols which were used in the emulsions 2a, 2b and 2c. The methylsiloxanes wherein $$X=SiO\underset{\underset{CH_3}{|}}{CH}CH_2NH_2\text{-groups}$$

are indicated in column 2, while the organic tin catalysts are listed in column 3. The water soluble esters of the silicic acid, titanic acid or zirconic acid are represented in column 4 of the Table:

TABLE

| | Column 1 | Column 2 | Column 3 | Column 4 |
|---|---|---|---|---|
| Polishing composition: | | | | |
| 2a | According to Formula I, 1,000 cp. | According to Formula I, $n=15$. | Dibutyltindilaurate | 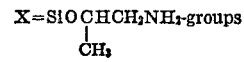 |
| 2b | According to Formula I, 400 cp. | According to Formula I, $n=15$. | ....do.... | $Zr[(OC_2H_4)_{12}OC_4H_9]_4$ |
| 2c | According to Formula II, $a=5.4; b=2$. | According to Formula II, $a=6; b=2$. | ....do.... | $C_2H_5OSi-\left[O-\underset{\underset{CH_3}{|}}{CH}-CH_2-\right]_3 N$ |

Preparation of the Comparison Emulsion 2d 5.5 parts by weight of the acid wax of examples 2a through 2c, 1.4 parts by weight of a fatty alcohol polyglycol ether (emulsifier), 0.7 parts by weight of triethanolamine, 20 parts by weight of white spirit, 2 parts by weight of highly disperse silicic acid, and 4 parts by weight of silicone oil of a viscosity of 500 cp. were processed with 66.4 parts by weight of water in conventional manner to form an emulsion.

siloxanols are indicated in column 1, while the methylsiloxanes with $$X = SiO\underset{\underset{CH_3}{|}}{C}HCH_2NH_2\text{-groups}$$

are referred to in column 2. The organic tin catalysts appear in column 3, while the water soluble esters of the silicic acid, titanic acid or zirconic acid are specified in column 4:

TABLE

| | Column 1 | Column 2 | Column 3 | Column 4 |
|---|---|---|---|---|
| Polishing composition: | | | | |
| 3a | According to Formula I, 1,000 cp. | According to Formula I, $n=15$. | Dibutyltindilaurate | $C_4H^9OZr\begin{pmatrix}OC_2H_4\\OC_2H_4\\OC_2H_4\end{pmatrix}N$ |
| 3b | According to Formula I, 400 cp. | do | do | $C_2H_5OSi\left[O-\underset{\underset{CH_3}{|}}{C}H-CH_2-\right]_3 N$ |

Preparation of Comparison or Control Emulsion 2e 5.5 parts by weight of an acid wax, 1.4 parts by weight of a fatty alcohol polyglycolester (emulsifier), 0.7 parts by weight of triethanolamine, 20 parts by weight of white spirit, 2 parts by weight of highly disperse silicic acid and 6 parts by weight of a commercially available silicone which contains amino groups bound by SiC-groups were processed with 64.4 parts by weight of water in conventional manner to form an emulsion.

The following table indicates the detergent resistance of the polishing compositions 2a through 2e as the consistency of the compositions after a storage period of 3 months.

TABLE

| | Number of washings necessary to wash off the polish | | Consistency of the polishing composition after a storage period of 3 months |
|---|---|---|---|
| | (a) | (b) | |
| Polishing composition: | | | |
| 2a | 7 | 7 | Unchanged. |
| 2b | 7 | 7 | Do. |
| 2c | 7 | 7 | Do. |
| 2d | 1–2 | 1–2 | Do. |
| 2e | 5–6 | 5–6 | Separated and ineffective after a storage period of 30 days. | a Measured 2 hours after application of the polishing composition.
b Measured 24 hours after application of the polishing composition.

EXAMPLE 3

This example describes the preparation and characteristics of polishing compositions which are added to wash water.

Preparation of the Inventive Emulsions 3a and 3b 10 parts by weight of an ester wax of the acid number 5,
0.5 parts by weight of a fatty alcohol polyglycolether (emulsifier),
2.2 parts by weight of methylsiloxanol,
0.8 parts by weight of a methylsiloxane with $$SiO\underset{\underset{CH_3}{|}}{C}HCH_2NH_2\text{-groups},$$

0.4 parts by weight of an organic tin catalyst,
1.3 parts by weight of a water soluble silicic acid, titanic acid or zirconic acid ester,
10 parts by weight of white spirit, and
16.5 parts by weight of isopropanol were worked up into an emulsion with 58.8 parts by weight of water. This emulsion was added to water at a volume ratio of 1:20.

The following table indicates the specific components used in the emulsions 3a and 3b. Thus the specific methyl-

Preparation of the Comparison Emulsion 3c 10 parts by weight of the ester wax of the examples 3a and 3b, 0.5 parts by weight of a fatty alcohol polyglycolether (emulsifier), 10 parts by weight of terpentine oil, 16.5 parts by weight of isopropanol, and 3.0 parts by weight of silicone oil of a viscosity of 350 cp. are worked up into an emulsion with 60 parts by weight of water. The product thus obtained corresponds to a prior art product which is diluted with water so that the volume ratio of preparation to water is 1:20.

The testing of the polish films is effected as described in connection with examples 1 and 2.

The following table indicates the detergent resistance of the polishing preparations 3a through 3c, as well as the consistency of the compositions after a storage period of 3 months.

TABLE

| | Number of washings necessary to wash off the polish | | Consistency of the polishing composition after a storage period of 3 months |
|---|---|---|---|
| | (a) | (b) | |
| Polishing composition: | | | |
| 3a | 3–4 | 3–4 | Unchanged. |
| 3b | 3–4 | 3–4 | Do. |
| 3c | 1 | 1 | Do. | a Measured 2 hours after application of the preserving agent.
b Measured 24 hours after application of the preserving agent.

EXAMPLE 4

This example is concerned with the preparation and characteristics of polishing compositions in solvent form containing additionally a certain amount of methylsiloxanes containing sulfatopropyl groups.

A polishing composition is prepared as shown in example 1 by using the following formulation 0.75 parts by weight acid groups containing wax having an acid number of 140 mg. KOH per gram wax,
1.75 parts by weight carnauba wax,
0.25 parts by weight methylsilicone oil having a viscosity of 5000 cp.,
1.50 parts by weight of an aminosiloxane according to formula I wherein $n=14.5$ and $$X = O-\underset{\underset{CH_3}{|}}{C}H-CH_2-NH_2,$$

1.10 parts by weight of a methylsiloxanol according to formula I wherein $X=OH$ and $n=20$,
0.30 partts by weight ethylpolysilicate having a $SiO_2$-content of about 40%,
0.15 parts by weight dibutyltindilaurate,
0.10 parts by weight methylsiloxanes containing sulfatopropyl groups according to formula IV wherein $m=5$ or 12, $A=$2-amino-2-methylpropanol-1 and $R=H$ and
94.10 parts by weight white spirit.

This polishing composition is showing an outstanding gloss depth obtained with low rubbing energy, and no formation of opaque stripes on dark lacquers. The polishing composition of this example is a very fine wax dispersion being very stable. The detergent stability is on the same level as without the addition of siloxanes containing sulfatopropyl groups. But without the addition of the siloxanes containing sulfatopropyl groups some problems may arise in respect of the formation of opaque stripes. The same is the case with formulations on the basis of other commercial aminosiloxanes.

The methylsiloxanes containing sulfatopropyl groups of this example were prepared according to the teachings the German Patent No. 1,157,789 by equilibrating 1 mol $$\left[\begin{array}{c} CH_3 \\ | \\ -Si-(CH_2)_3-O-\overset{O}{\underset{O}{\overset{\|}{S}}}-O \\ | \\ Cl \end{array}\right]$$

with 5/4 resp. 3 mol octamethylcyclotetrasiloxane and reacting the equilibrate with water and 2-amino-2-methyl-propanol.

What is claimed is:

1. In a liquid polishing preparation for polishing hard glossy surfaces, such as the surfaces of car bodies, wherein the preparation contains as active ingredient (a) natural and/or synthetic wax of an acid number of from 5 to 200 and having a solidification point of between 60 and 100° C., the improvement which comprises that the preparation also contains a mixture consisting essentially of (b) 30 to 60% by weight of methylsiloxanols of a viscosity of 25 to 1000 cp., having an OH-content of not more than 8.8% by weight, 10 to 30% by weight of methylsiloxanes containing $SiOMNZ_2$- groups, wherein M is a bivalent hydrocarbon which bridges O and N through at least 2 carbon atoms and Z stands for alkyl, aryl, the group $$(CH_2CH_2NH)_{0-4}-CH_2CH_2NH_2,$$

the group $$CH_2-CH-OH \\ | \\ Y$$

or hydrogen, wherein Y is hydrogen or methyl, 5 to 15% by weight of an organic tin catalyst capable of inducing hardening of silicones, and 15 to 40% by weight of esters of aliphatic alcohols of silicic acid, titanic acid or zirconic acid, and/or their partial hydrolysates, and/or their condensation products, or fatty acid acylates of Ti or Zr, in which the fatty acid has a carbon number of at least 8.

the ratio of $(a):(b)$ being between 1:4 to 4:1.

2. The improvement as claimed in claim 1, wherein the mixture (a), (b) is dissolved in an organic solvent.

3. The improvement as claimed in claim 2, wherein the mixture (a), (b) is dissolved in an organic solvent in an amount such that the concentration of component (a) is between about 1.5 to 8% by weight, while the concentration of component (b) is between about 1.5 to 5% by weight.

4. The improvement as claimed in claim 1, wherein the mixture (a), (b) is emulsified in water.

5. The improvement as claimed in claim 4, wherein the amount of the mixture (a), (b) in said emulsion is such that the concentration of the component (a) is about between 1.5 to 15% by weight, while the concentration of component (b) is about between 1.5 to 5% by weight.

6. The improvement as claimed in claim 1, wherein said methylsiloxanol of component (b) contains from 0 to 15 mol percent of $CH_3SiO_{3/2}$-groups.

7. The improvement as claimed in claim 1, wherein said methylsiloxanes of component (b) contain 2 to 50 $SiOMNZ_2$-groups per molecule, the ratio of $SiCH_3$-groups: $SiOMNZ_2$-groups being between about 1:1 to 100:1.

8. The improvement as claimed in claim 1, wherein said tin catalyst of component (b) is dibutyltindilaurate, dimethyltindihexoate or tinoctoate.

9. The improvement as claimed in claim 1, wherein said esters of component (b) are the mono-, di-, or triethanolamine esters or the mono-, di-, or triisopropanolamine esters or esters of polyethyleneglycolmonoethers.

10. The improvement as claimed in claim 1, wherein the preparation additionally contains dimethylsilicone oils of a viscosity of 1000 to 10,000 cp., the amount of said silicone oils being such that 2 parts by weight of component (a) correspond to 0.25 to 1.5 parts by weight of dimethylsilicone oil.

11. The improvement as claimed in claim 1, wherein the acid number of the wax of component (a) is such that one COOH-group of the wax corresponds to one N-atom of the methylsiloxane of the formula $SiOMNZ_2$.

12. The improvement as claimed in claim 1, wherein said methylsiloxanols of component (b) are linear or branched.

13. The improvement as claimed in claim 1, wherein the methylsiloxanols of component (b) is a polymer of the formula $$X-\left[\begin{array}{c} CH_3 \\ | \\ Si-O- \\ | \\ CH_3 \end{array}\right]_n \begin{array}{c} CH_3 \\ | \\ Si-X \\ | \\ CH_3 \end{array}$$

wherein $n \geq 4$, and X stands for hydroxyl, or is a polymer of the formula $$X-\underset{CH_3}{\overset{CH_3}{\underset{|}{Si}}}-O-\left[\begin{array}{c} CH_3 \\ | \\ Si-O- \\ | \\ CH_3 \end{array}\right]_a \left[\begin{array}{c} CH_3 \\ | \\ Si-O- \\ | \\ O \\ | \\ CH_3-Si-CH_3 \\ | \\ O \\ | \\ CH_3-Si-CH_3 \\ | \\ X \end{array}\right]_b \left[\begin{array}{c} CH_3 \\ | \\ Si-O- \\ | \\ CH_3 \end{array}\right]_a \begin{array}{c} CH_3 \\ | \\ Si-X \\ | \\ CH_3 \end{array}$$

wherein X is hydroxyl, $a \geq 1, 5$, and $b$ has a value of from 0 to 20.

14. The improvement as claimed in claim 1, wherein the symbol M of the methylsiloxanes of component (b) stands for $$-CH-CH_2-, \quad -CH_2CH_2-, \text{ or } -CH_2CH_2CH_2-. \\ | \\ CH_3$$

15. The improvement as claimed in claim 1, wherein said methylsiloxane of (b) corresponds to the formula $$(CH_3)_3SiO-\left[\begin{array}{c} CH_3 \\ | \\ Si-O- \\ | \\ O \\ | \\ M \\ | \\ NZ_2 \end{array}\right]_d \left[\begin{array}{c} CH_3 \\ | \\ Si-O- \\ | \\ CH_3 \end{array}\right]_c Si(CH_3)_3$$

wherein $c$ has a value of from 0 to 100, and $d$ has a value of from 3 to 50, and/or said methylsiloxane of (b) component is a polymer of the formula $$X-\left[\begin{array}{c} CH_3 \\ | \\ Si-O- \\ | \\ CH_3 \end{array}\right]_n \begin{array}{c} CH_3 \\ | \\ Si-X \\ | \\ CH_3 \end{array}$$

wherein $n \geq 4$, and X stands for $OMNZ_2$, and/or is a polymer of the formula $$X-\underset{CH_3}{\overset{CH_3}{\underset{|}{Si}}}-O-\left[\begin{array}{c} CH_3 \\ | \\ Si-O- \\ | \\ CH_3 \end{array}\right]_a \left[\begin{array}{c} CH_3 \\ | \\ Si-O- \\ | \\ O \\ | \\ CH_3-Si-CH_3 \\ | \\ O \\ | \\ CH_3-Si-CH_3 \\ | \\ X \end{array}\right]_b \left[\begin{array}{c} CH_3 \\ | \\ Si-O- \\ | \\ CH_3 \end{array}\right]_a \begin{array}{c} CH_3 \\ | \\ Si-X \\ | \\ CH_3 \end{array}$$

wherein X is $OMNZ_2$, $a \geq 1, 5$, and $b$ has a value of from 0 to 20.

16. A liquid polishing preparation as claimed in claim 1, wherein the preparation contains additionally methylsiloxanes having sulfatopropyl groups of formula

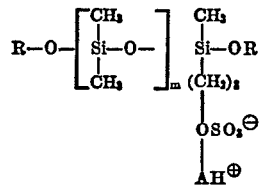

wherein R is a lower alkyl with 1 to 3 carbon atoms, $(CH_3)_3Si-$ or H; $AH^\oplus$ is a substituted ammonium group derived from primary, secondary or tertiary amines, having not more than 12 carbon atoms and $m$ is 0 to 20 if $R = (CH_3)Si$ or 2 to 20 if R is a lower alkyl or H.

17. The improvement of claim 16, wherein said $AH^\oplus$ is isopropylammonium, triethylammonium, diethylammonium or dodecylammonium.

References Cited

UNITED STATES PATENTS

| | | | |
|---|---|---|---|
| 2,798,858 | 7/1957 | Brown | 260—28 |
| 3,702,769 | 11/1972 | Vaughn | 260—28 |
| 2,807,554 | 9/1957 | Serey | 260—28 |
| 2,928,799 | 3/1960 | Brown | 260—28 |

FOREIGN PATENTS

| | | |
|---|---|---|
| 1,185,957 | 4/1970 | Great Britain. |

ALLAN LIEBERMAN, Primary Examiner

P. R. MICHL, Assistant Examiner

U.S. Cl. X.R.

106—10